US006853367B1

(12) United States Patent
Liebenow

(10) Patent No.: US 6,853,367 B1
(45) Date of Patent: *Feb. 8, 2005

(54) COMPUTER KEYBOARD DISPLAY DEVICE CONTROL

(75) Inventor: Frank W. Liebenow, Dakota Dunes, SD (US)

(73) Assignee: Gateway, Inc., Irvine, CA (US)

(\*) Notice: Subject to any disclaimer, the term of this patent is extended or adjusted under 35 U.S.C. 154(b) by 229 days.

This patent is subject to a terminal disclaimer.

(21) Appl. No.: 10/016,492

(22) Filed: Feb. 11, 2002

Related U.S. Application Data

(63) Continuation of application No. 09/014,797, filed on Jan. 28, 1998, now Pat. No. 6,323,873.

(51) Int. Cl.⁷ .................................................. G09G 5/00
(52) U.S. Cl. ........................................ 345/168; 345/173
(58) Field of Search ................................ 345/168, 145, 345/163, 146, 173, 156, 157, 159, 121, 123, 204, 904, 810, 342, 362; 165/11.1; 455/508, 520; 713/2

(56) References Cited

U.S. PATENT DOCUMENTS

| | | | |
|---|---|---|---|
| 4,656,364 A | 4/1987 | Yokogawa et al. | 307/112 |
| 4,682,164 A | 7/1987 | Lacy | 340/825.03 |
| 4,701,630 A | 10/1987 | Annunziata et al. | 307/112 |
| 4,782,245 A | 11/1988 | Henry | 307/147 |
| 5,124,689 A | 6/1992 | Franz et al. | 340/711 |
| 5,274,766 A | 12/1993 | Long et al. | 395/275 |
| 5,422,520 A | 6/1995 | Shimuzu et al. | 307/116 |
| 5,426,738 A | 6/1995 | Hsieh et al. | 395/275 |
| 5,457,473 A | 10/1995 | Arai et al. | |
| 5,515,045 A | 5/1996 | Tak | 341/23 |
| 5,565,897 A | 10/1996 | Kikinis et al. | 345/213 |
| 5,574,318 A | 11/1996 | Gost | 307/112 |
| 5,754,960 A * | 5/1998 | Downs et al. | 455/508 |
| 5,790,096 A | 8/1998 | Hill, Jr. | 345/150 |
| 5,881,318 A | 3/1999 | Liebenow | 395/887 |
| 5,950,709 A * | 9/1999 | Krueger et al. | 165/11.1 |
| 5,990,872 A | 11/1999 | Jorgenson et al. | 345/168 |
| 6,038,614 A | 3/2000 | Chan et al. | 710/1 |
| 6,049,871 A * | 4/2000 | Silen et al. | 713/2 |
| 6,169,535 B1 * | 1/2001 | Lee | 345/660 |
| 6,208,876 B1 * | 3/2001 | Raussi et al. | 455/557 |
| 6,215,531 B1 * | 4/2001 | Beery | 348/734 |
| 6,396,477 B1 * | 5/2002 | Hinckley et al. | 345/163 |
| 6,552,738 B1 * | 4/2003 | Lin et al. | 345/810 |

OTHER PUBLICATIONS

"Display Data Channel (DDC) Technical Overview", Published by Computer Access Technology Corporation, http://www.catc.com/ddc_tech.htm, pp. 1–3, (Printed Dec. 18, 1996).

"Display Data Channel Standard", Video Electronic Standards Association, Version 2, Revision 0, pp. 1–35, (Apr. 9, 1996).

Messmer, H., "The Indispensable PC Hardware Book", 2nd Edition, Addison–Wesley Publishers Ltd., (1995).

Messmer, H., "The Indispensable PC Hardware Book", 2nd Edition, Addison–Wesley Publishers Ltd., (1995).

Messmer, H., "The Indispensable PC Hardware Book—Your Hardware Questions Answered", *Second Edition, Addison–Wesley Publishing Company*, 919–53, (1995).

\* cited by examiner

*Primary Examiner*—Vijay Shankar
*Assistant Examiner*—Prabodh M. Dharia
(74) *Attorney, Agent, or Firm*—Schwegman, Lundberg, Woessner & Kluth, P.A.

(57) ABSTRACT

Computer keyboard control of the characteristics of a display device coupled to a computer through the basic input/output system (BIOS) of the computer is disclosed. In one embodiment, a computerized system includes a computer, a display device, and a keyboard. The display device is responsive to at least one display control command, each command associated with a characteristic of the display device, such as contrast or brightness. The BIOS, in response to detecting a predetermined sequence of keystrokes entered by the user on the keyboard, operatively sends the display device a corresponding display control command.

26 Claims, 2 Drawing Sheets

FIG. 2
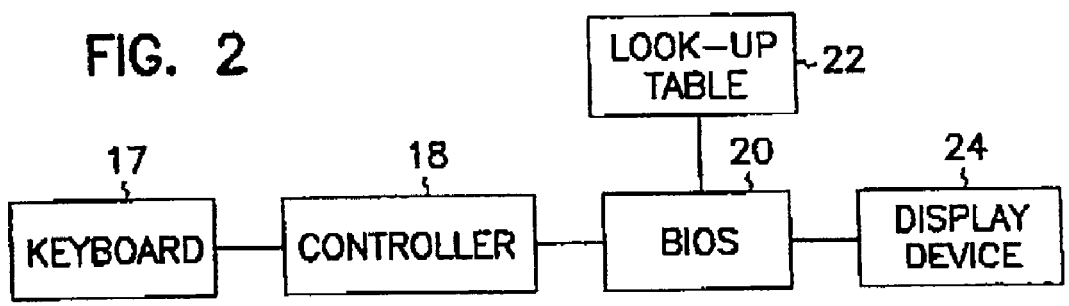
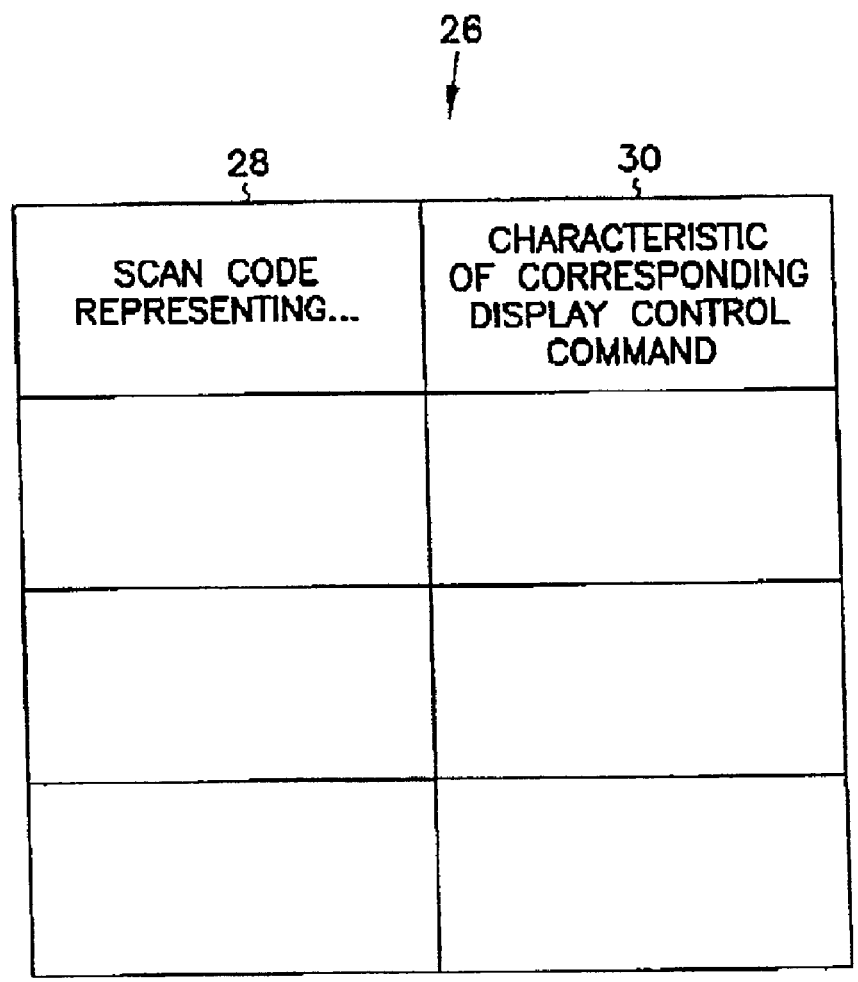
FIG. 3

COMPUTER KEYBOARD DISPLAY DEVICE CONTROL

RELATED APPLICATION

This is a continuation of U.S. application Ser. No. 09/014,797, filed Jan. 28, 1998, which application is incorporated herein by reference now U.S. Pat. No. 6,323,873.

FIELD OF THE INVENTION

This invention relates generally to computer keyboard control of the characteristics of a display device coupled to a computer, and more particularly to such keyboard control through the basic input/output system (BIOS) of the computer.

BACKGROUND OF THE INVENTION

As computer technology has advanced, computer users have grown accustomed to greater ease of use when utilizing computers. For example, modern devices, which permit a user of the computer to among other things connect to the Internet, have gone from external devices having separate controls to internal devices controlled through a keyboard operatively coupled to the computer.

However, this ease of use has not fully extended to display devices for computers, such as monitors housing cathode-ray tubes (CRTs). Characteristics of display devices, such as brightness, contrast and volume, are usually controlled through separate controls on the display device itself. As the size of the monitor in a typical system has increased, and as the applications in which a computer is used more as a home entertainment system than as a business system have become more common, the monitor is frequently located far away from the rest of the computer system. Controlling the characteristics of the display device in these situations poses a disadvantageous inconvenience to the user of the computer.

Even computer designers are disadvantaged by this lack of ease of use in controlling display device characteristics. For example, laptop computer designers are forced to integrate the controls for the display device of a laptop computer, typically a flat panel display such as a liquid crystal display (LCD), as hot keys on the keyboard. However, this means that proprietary hardware and software typically must be developed for every different type of laptop to control the display device characteristics, which is burdensome and costly.

Software-only solutions to controlling display device characteristics are also problematic. Such software-only solutions are usually stand-alone or terminate-and-stay-resident programs. For example, a user of a PC-compatible computer running a Microsoft Windows operating system may load a stand-alone program from a hard disk drive into memory. A drawback is that such a stand-alone program is operable only if the Microsoft Windows operating system is used. The program may also not be compatible with other programs running on the computer. Most significantly, such stand-alone programs must be the active program in order to work. For example, a user who loads such a program and then subsequently loads another program has to first re-select the program before being able to use it again.

Terminate-and-stay-resident programs also have numerous drawbacks. Terminate-and-stay-resident programs operate at a lower level within the operating system than do stand-alone programs and therefore stay active all the time. However, they are generally still specific to a particular operating system, and cannot be used with different operating systems running on the same computer. Furthermore, such programs are known to be incompatible with other programs, limiting their usefulness. Terminate-and-stay resident programs also take up valuable lower or base memory on a computer (i.e., the lowest 640 kilobytes of random-access memory on a PC-compatible computer).

There is a need, therefore, for controlling the characteristics of the display device without having to use the separate controls on the display device itself. There is a need for providing for such control without the need for burdensome and costly proprietary hardware and software. There is a need for providing such control that is not specific to any particular operating system. There is a need for such control in a manner that is compatible with other programs that may also be running on the computer at the same time, that does not take up base memory, and that is active to the computer user at all times.

SUMMARY OF THE INVENTION

The above-mentioned shortcomings and needs are addressed by the present invention, which will be understood by reading and studying the following specification. The present invention describes keyboard control of the characteristics of a display device through the basic input/output system (BIOS) of a computer. The BIOS recognizes one or more predetermined sequences of keystrokes entered on a keyboard coupled to the computer. Each predetermined sequence controls a characteristic of the display device through the BIOS.

In one embodiment, the display device is responsive to at least one display control command from the computer, each display control command associated with a display device characteristic. Entry of a predetermined sequence of one or more keystrokes on the keyboard causes the BIOS of the computer to send a display control command associated with the predetermined sequence to the display device, to change a characteristic associated with the display control command. Such characteristics include brightness, contrast and volume.

In this manner, the invention provides for a number of advantages. The display device characteristics are changed without resort to any separate controls on the display device itself. Because a BIOS is found within nearly every PC-compatible computer, costly and burdensome development of new hardware and software is not required. Also because keyboard control is implemented within the BIOS, it is not dependent on any particular operating system. Because the invention is not a computer program executed by the operating system, it also cannot conflict with any program within memory that is executed by the operating system. As part of the BIOS, the invention does not take up scarce base memory, and is active to the user at all times the computer is on.

Different embodiments of the invention include computerized systems, a basic input/output system (BIOS), a computer and a computer-readable storage medium, all according to the principles of the invention. Still other and further aspects, advantages and embodiments will become apparent by reference to the drawings and by reading the following description.

BRIEF DESCRIPTION OF THE DRAWINGS

FIG. 2 is a block diagram of one embodiment of the invention; and,

FIG. 3 is a diagram of one embodiment of a look-up table of a BIOS for the present invention.

DETAILED DESCRIPTION OF THE INVENTION

Figure 1:
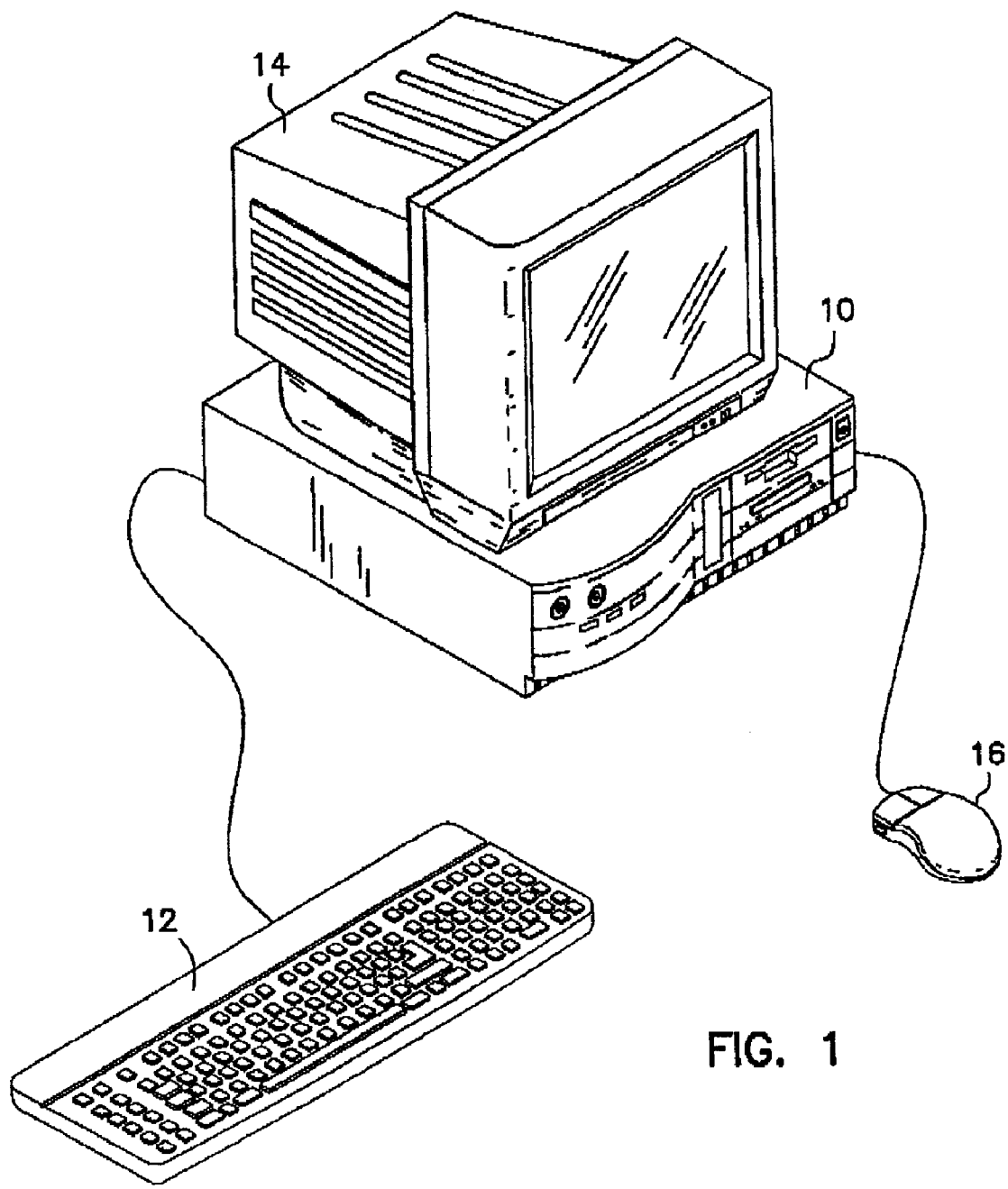
FIG. 1 is a diagram of a computerized system in which the present invention is typically implemented.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. The following detailed description is, therefore, not to be taken in a limiting sense, and the scope of the present invention is defined only by the appended claims.

The present invention provides for computer keyboard control of display device characteristics. The present invention is not limited as to the type of the computer on which it operates. However, a typical example of such a computer is shown in FIG. 1. Computer 10 is a desktop computer, such as a Gateway 2000 desktop computer. Not shown is that computer 10 also comprises a random-access memory (RAM) (preferably, at least sixteen megabytes), a read-only memory (ROM), a processor (preferably, an Intel Pentium processor), and one or more storage devices, such as a hard disk drive, a floppy disk drive, and a tape cartridge drive. Preferably, computer 10 is running a Microsoft Windows operating system. Also not shown in FIG. 1 is that computer 10 includes a basic input/output system (BIOS), which is a set of programs typically installed in the ROM or a storage device of a computer and which provide the most basic control and management of the computer's hardware.

Computer 10 as shown in FIG. 1 includes and/or is operatively coupled to keyboard 12, display device 14, and mouse pointing device 16. Keyboard 12 permits entry of textual information into the computer via depression of one or more of a plurality of keys. In particular, in conjunction with the present invention, keyboard 12 permits entry of one or more predetermined sequences of one or more keystrokes by a user of the computer, each predetermined sequence controlling a characteristic of the display device through the BIOS. Mouse pointing device 16 is an input device permitting control over the graphical user interface of the operating system (e.g., a Microsoft Windows operating system). For example, mouse pointing device 16 permits a user to control the movement of a pointer within the graphical user interface. The invention is not limited to any particular pointing device 16. Other devices include a touch pad, a wheel, a trackball, and a joystick.

Display device 14 permits display of information by the computer, and preferably includes a speaker to make audible other information from the computer. The invention is not limited to any particular display device 14. In the case of a non-portable computer 10, display device 14 is preferably a monitor housing a cathode-ray tube (CRT). Preferably, display device 14 is responsive to at least one display control command, where each display control command is associated with a characteristic of the display device. Characteristics of display device 14 include but are not limited to contrast, audio controls (such as volume), vertical sizing, vertical positioning, horizontal sizing, horizontal sizing, horizontal positioning, pin cushion, rotation, trapezoid, and brightness. Typical display devices responsive to display control commands include those that support the VESA display data channel (DDC) standard. DDC is known to those skilled in the art, and described in a technical overview published at the Internet world-wide-web site http://www.catc.com/ddc_tech.htm, which is hereby incorporated by reference. Further information regarding DDC is described in the DDC 2.0 standard specification, available from the Video Electronic Standards Association (VESA), of San Jose, Calif., which is also hereby incorporated by reference. Display device 14 is preferably a DDC2B OR DDC2AB-compliant monitor, and is also preferably what is know within the art as Plug-and-Play compliant.

In conjunction with the computerized system shown in and described in conjunction with FIG. 1, the invention operates as follows. A user of the computer enters a predetermined sequence of at least one keystroke onto keyboard 12. This sequence corresponds to a display control command, to which display device 14 is responsive. The BIOS of computer 10 detects this predetermined sequence, and in response sends to display device 14 the corresponding display control command. This display control command corresponds to changing a characteristic of the display device (increasing the brightness of the CRT, for example). In response to receiving the command, display device 14 changes the characteristic associated with the command correspondingly.

The operation of the present invention is better illustrated and understood by reference to FIG. 2, which shows a block diagram according to one embodiment of the present invention. Computer 10 includes keyboard controller 18, look-up table 22, BIOS 20, and display device controller 23. Display device 24 is separate to computer 10, and is operatively coupled to controller 23 of computer 10. Keyboard 17 is also separate to computer 10, and is operatively coupled to controller 18 of computer 10.

Within computer 10, keyboard controller 18 is operatively coupled to BIOS 20, which itself is operatively coupled to look-up table 22 and display device controller 23. Display device 24 in one embodiment is internal and resides within the computer (e.g., a portable computer), whereas in another embodiment it is external to the computer (e.g., a desktop computer). The present invention is not limited to any particular component residing in any particular physical device.

Controller 18 is a keyboard controller, preferably an integrated circuit (IC) such as the Intel 8042. Keyboard controllers, such as those described generally on page 920 et seq. of the Indispensable PC Hardware Book (2d ed.), which is hereby incorporated by reference, are known within the art. Generally, controller 18 constantly scans circuits leading to the key switches of the individual keys within keyboard 17. It detects the increase or decrease in current from the key that has been pressed. By detecting either an increase or decrease in current, the controller can tell both when a key has been pressed and when it has been released. Each key has a unique set of codes associated with the key. These codes are known as scan codes. There are two scan codes for each key, one for when the key is depressed and the other for when the key is released. When a user presses or releases a key, controller 18 stores the associate scan code in its buffer, and then signals BIOS 20 via an interrupt request (e.g., IRQ 1) that it has a scan code waiting in the buffer. BIOS 20 then receives this scan code from controller 18. Upon receiving the scan code, BIOS 20 instructs controller 18 to delete the code from its buffer.

As has been described, BIOS 20 is a Basic Input/Output System, which is a set of programs installed in the ROM or a storage device of a computer and which provides the most basic control and management of the computer's hardware. Upon the computer booting, BIOS 20 is typically transferred into RAM, and it is this copy of the BIOS that is used typically to provide the basic control and management of the computer's hardware. As compared to the other levels of software of a computer (operating system and stand-alone programs), the BIOS is the bottom-most software layer in the computer. It functions as the interface between the hardware and the other layers of software, isolating them from the details as to how the underlying hardware is actually implemented. Thus, the underlying hardware can change without affecting the higher level software.

BIOS 20, upon receiving a scan code from controller 18, determines if the scan code corresponds to one of the ordinary shift keys or one of the keys that are considered to be special shift keys and toggle keys, such as CTRL, ALT, NUM LOCK, CAPS LOCK, SCROLL LOCK, FUNCTION, INSERT, etc. If the scan code corresponds to one of these latter keys, BIOS 20 maintains a record of which of these keys are being pressed, by changing what is known as a "shift-state" byte. For all other keys, BIOS 20 translates the scan code by looking up the scan code, along with the record of which of the shift keys, special shift keys, and toggle keys are currently being pressed, in look-up table 22. Look-up table 22 is also implemented within the ROM or a storage device of a computer (e.g., computer 10 of FIG. 1). After translating the scan code by looking it up in table 22, BIOS 20 executes the corresponding command. With respect to the present invention, BIOS 20 sends display device 24 the display control command corresponding to a sequence of keystrokes entered on keyboard 17 and detected by controller 18.

The embodiment of the present invention as shown in FIG. 2 works as follows. Controller 18 detects a series of keystrokes entered on the keyboard and sends the scan codes corresponding to the keystrokes to BIOS 20. BIOS 20 translates the scan code by looking up the scan code, along with the record of which of the shift keys, special shift keys, and toggle keys are also currently being pressed, in look-up table 22. If the keystrokes entered on the keyboard correspond to a display control command, then BIOS sends to display device 24 this command through display device controller 23, the construction of which are known within the art. Display device 24, upon reception of the command from display device controller 23, correspondingly changes a characteristic of the device associated with the command.

For example, the user may have entered on the keyboard the series of keystrokes CTRL-SHIFT-+. Controller 18 detects this series of keystrokes and sends the scan codes corresponding thereto to BIOS 20. BIOS 20 may translate the scan code corresponding to the series of keystrokes CTRL-SHIFT-+ in look-up table 22 as corresponding to a display control command increase brightness. BIOS 20 then sends this display control command to display device 24 via display device controller 23, which correspondingly increases the brightness of its display tube. For example, for a DDC-compatible device, the display control command is sent by BIOS 20 over the display data channel of the device.

The present invention is not limited to any particular set of keystrokes mapped to any particular set of display control commands associated with specific display device characteristics. Any keystroke can be mapped to any display control command associated with any specific display device characteristic without departing from the scope of the invention. One particular embodiment of keystroke to display control command mapping is shown in FIG. 3, which is a diagram of one embodiment of a look-up table of a BIOS for the present invention. Table 26 includes columns 28 and 30, in which column 30 lists the characteristic of the display device control command corresponding to the keystrokes listed in column 28. Thus, the BIOS looks up the scan code representing a particular sequence of keystrokes in column 28, and sends to the display device the display command for the characteristic in column 30.

The Keyboard

Depending upon whether you use a keyboard with American, British or some other language assignment, some control, shift or other keys may be named differently. Furthermore, in the literature you will sometimes find different names for the same key, for example the enter or CR keys. Therefore, the following table lists some different names for these keys.

| Name | Alternative names |
|---|---|
| enter key | CR key |
| control key (Ctrl) | |
| alternative key (Alt) | |
| shift key (Shift) | |
| shift-lock key | caps-lock |
| cursor up | |
| cursor down | |
| cursor left | |
| cursor right | |
| insert (ins) | |
| delete (Del) | |
| cursor home (Home) | clear-home |
| end (End) | |
| page up (Pg Up) | |
| page down (Pg Dn) | |
| system request (S-Reg) | |

Scan Codes—A Keyboard Map

You may have wondered how a keyboard with a British keyboard layout can be connected to a Taiwanese PC without the PC always mixing Chinese and English. The reason is quite simple: every key is assigned a so-called scan code that identifies it.

| | Scan Codes USA | |
|---|---|---|
| | scan code | |
| key | dec | hex |
| F1 | 59 | 3b |
| F2 | 60 | 3c |
| F3 | 61 | 3d |
| F4 | 62 | 3e |
| F5 | 63 | 3f |
| F6 | 64 | 40 |
| F7 | 65 | 41 |
| F8 | 66 | 42 |
| F9 | 67 | 43 |
| F10 | 68 | 44 |
| Scroll | 70 | 46 |
| home | 71 | 47 |
| cursor up | 72 | 48 |
| page up | 73 | 49 |
| cursor le | 75 | 4b |
| cursor ri | 77 | 4d |
| end | 79 | 4f |
| cursor do | 80 | 50 |
| page do | 81 | 51 |
| F11 | 87 | 57 |
| F12 | 88 | 58 |

As has been described, the present invention provides for a number of advantages. Because the invention is implemented within the BIOS of a computer, the invention is operating system independent. The BIOS of a computer is at a lower level within the computer's architecture than is the operating system. Any operating system implemented on a computer generally must interact with the computer's BIOS. By implementing keyboard control of display device characteristics within the BIOS, the invention is not tied to any particular operating system.

Because the invention is implemented within the BIOS, it is also compatible with most existing stand-alone programs. Stand-alone programs are at a higher level within the computer architecture than operating systems. A given program access the operating system, which then accesses the BIOS, which then accesses the hardware. Because the invention implements its functionality at a different lower level within the architecture as compared to stand-alone programs, the potential for incompatibility is reduced greatly.

The invention also provides for the advantage of not taking up scarce base memory of a computer. Terminate-and-stay resident programs, by contrast, are stored in the lowest 640 kilobytes of RAM of a computer. This memory is scarce in that significant functionality of the computer must reside within base memory. By residing with BIOS instead, the invention conserves base memory.

The invention provides for immediate and automatic functionality as soon as the computer turned on. When the computer is turned on, the BIOS conducts a series of complex test of all hardware devices installed on the computer (known as the Power-On Self Test, or POST). After this test is complete, the operating system is then loaded. By the time the operating system is loaded, the BIOS is already functioning, and the invention is available to the user.

The present invention also provides for keyboard control of the monitor that is always active. When an appropriate sequence of keystrokes is entered into the keyboard, the BIOS conveys to the display device the appropriate corresponding display control command. Because the BIOS is at a lower level than the operating system or stand-alone programs, it conveys the command to the display device before the operating system or a stand-alone program can act on the keystroke. Thus, entering in the predetermined keystrokes (as exemplified in FIG. 3), permits such control regardless of the operating system and stand-alone programs running on the operating system.

Finally, because the display device is controlled by the keyboard, resorting to separate controls on the display device itself is unnecessary. Insofar as the display device is located at a distance from the keyboard, this renders unnecessary the user of the computer having to get up and go to the display device to change its characteristics. Moreover, costly and burdensome development of new hardware and software is not required, since the invention utilizes the BIOS.

Although specific embodiments have been illustrated and described herein, it will be appreciated by those skilled in the art that any arrangement which is calculated to achieve the same purpose may be substituted for the specific embodiment shown. This application is intended to cover any adaptations or variations of the present invention. Therefore, it is manifestly intended that this invention be limited only by the following claims and equivalents thereof.

I claim:

1. A computerized system for keyboard control of at least one display device characteristic comprising:

a computer having at least a processor, a memory, and a basic input/output system BIOS);

a display device operatively coupled to the computer; and a keyboard operatively coupled to the computer for entry of one or more predetermined sequences of two keystrokes by a user of the computer, each predetermined sequence controlling a characteristic of the display device through the BIOS, wherein the BIOS in response to detecting the predetermined sequence of keystrokes operatively translates the predetermined sequence of keystrokes into a corresponding display control command and sends the display device the corresponding display control command;

wherein a first keystroke of the two keystrokes is a function key; and wherein the display device is responsive to at least one display control command from the BIOS, each display control command associated with a characteristic of the display device.

2. The computerized system of claim 1, wherein the second keystroke of the two keystrokes is an F5 key and wherein the corresponding display control command is to increase brightness of the display device.

3. The computerized system of claim 1, wherein the second keystroke of the two keystrokes is an F6 key and wherein the corresponding display control command is to decrease brightness of the display device.

4. The computerized system of claim 1, wherein the second keystroke of the two keystrokes is an F7 key and wherein the corresponding display control command is to increase contrast of the display device.

5. The computerized system of claim 1, wherein the second keystroke of the two keystrokes is an F8 key and wherein the corresponding display control command is to decrease contrast of the display device.

6. The computerized system of claim 1, wherein the second keystroke of the two keystrokes is a cursor-up key and wherein the corresponding display control command is to increase brightness of the display device.

7. The computerized system of claim 1, wherein the second keystroke of the two keystrokes is an cursor-down key and wherein the corresponding display control command is to decrease brightness of the display device.

8. The computerized system of claim 1, wherein the second keystroke of the two keystrokes is a cursor-left key and wherein the corresponding display control command is to decrease contrast of the display device.

9. The computerized system of claim 1, wherein the second keystroke of the two keystrokes is an cursor-right key and wherein the corresponding display control command is to increase contrast of the display device.

10. The computerized system of claim 1, wherein the second keystroke of the two keystrokes is an F1 key and wherein the corresponding display control command is to decrease brightness of the display device.

11. The computerized system of claim 1, wherein the second keystroke of the two keystrokes is an F2 key and wherein the corresponding display control command is to increase brightness of the display device.

12. The computerized system of claim 1, wherein the second keystroke of the two keystrokes is an cursor-up key and wherein the corresponding display control command is to decrease brightness of the display device.

13. The computerized system of claim 1, wherein the second keystroke of the two keystrokes is an cursor-down key and wherein the corresponding display control command is to increase brightness of the display device.

14. The computerized system of claim 1, wherein the second keystroke of the two keystrokes is selected from a group consisting of F1, F2, F3, F4, F5, F6, F7, F8, F9, F10, F11, F12, cursor-up, cursor-down, cursor-right, cursor-left, page-up, page-down, and end.

15. A computerized system for keyboard control of at least one display device characteristic comprising:

a computer having at least a processor, a memory, and a basic input/output system (BIOS);

a display device operatively coupled to the computer; and a keyboard operatively coupled to the computer for entry of one or more predetermined sequences of two keystrokes by a user of the computer, each predetermined sequence controlling a characteristic of the display device through the BIOS, wherein the BIOS in response to detecting the predetermined sequence of keystrokes operatively translates the predetermined sequence of keystrokes into a corresponding display control command and sends the display device the corresponding display control command;

wherein a first keystroke of the two keystrokes is a function key; and wherein the display device is responsive to at least one display control command from the BIOS, each display control command associated with a characteristic of the display device, wherein the characteristic of the display device includes audio controls.

16. The computerized system of claim 15, wherein the second keystroke of the two keystrokes is a F5 key and wherein the corresponding display control command is to mute the volume of a speaker.

17. The computerized system of claim 15, wherein the second keystroke of the two keystrokes is a F4 key and wherein the corresponding display control command is to mute the volume of a speaker.

18. The computerized system of claim 15, wherein the second keystroke of the two keystrokes is a F3 key and wherein the corresponding display control command is to decrease the volume of a speaker.

19. The computerized system of claim 15, wherein the second keystroke of the two keystrokes is a F4 key and wherein the corresponding display control command is to increase the volume of a speaker.

20. The computerized system of claim 15, wherein the second keystroke of the two keystrokes is a F6 key and wherein the corresponding display control command is to mute the volume of a speaker.

21. The computerized system of claim 15, wherein the second keystroke of the two keystrokes is a F5 key and wherein the corresponding display control command is to increase volume of a speaker.

22. The computerized system of claim 15, wherein the second keystroke of the two keystrokes is an F3 key and wherein the corresponding display control command is to mute volume of a speaker.

23. The computerized system of claim 15, wherein the second keystroke of the two keystrokes is a page-down key and wherein the corresponding display control command is to decrease the volume of a speaker.

24. The computerized system of claim 15, wherein the second keystroke of the two keystrokes is a page-up key and wherein the corresponding display control command is to increase the volume of a speaker.

25. The computerized system of claim 15, wherein the second keystroke of the two keystrokes is an end key and wherein the corresponding display control command is to mute volume of a speaker.

26. The computerized system of claim 15, wherein the second keystroke of the two keystrokes is selected from a group consisting of: F1, F2, F3, F4, F5, F6, F7, F8, F9, F10, F11, F12, cursor-up, cursor-down, cursor-right, cursor-left, page-up, page-down, and end.

* * * * *